United States Patent
Chen et al.

(10) Patent No.: US 7,142,246 B2
(45) Date of Patent: Nov. 28, 2006

(54) APPARATUS AND METHOD FOR DE-INTERLACING VIDEO, INCLUDING 3:2 PULLDOWN VIDEO

(75) Inventors: Yen-Ting Chen, Taipei (TW); Pei-Ming Shan, Hsinchu (TW)

(73) Assignee: Macronix International Co., Ltd., Hsinchu (TW)

(*) Notice: Subject to any disclaimer, the term of this patent is extended or adjusted under 35 U.S.C. 154(b) by 653 days.

(21) Appl. No.: 10/403,456

(22) Filed: Mar. 31, 2003

(65) Prior Publication Data
US 2004/0189865 A1   Sep. 30, 2004

(51) Int. Cl.
*H04N 7/01* (2006.01)
*H04N 11/20* (2006.01)

(52) U.S. Cl. ..................... 348/448; 348/459
(58) Field of Classification Search ........ 348/448–452, 348/97, 459, 700, 558
See application file for complete search history.

(56) References Cited

U.S. PATENT DOCUMENTS

| | | | |
|---|---|---|---|
| 5,398,071 A | 3/1995 | Gove et al. | |
| 5,689,301 A | 11/1997 | Christopher et al. | |
| 6,055,018 A | 4/2000 | Swan | |
| 6,784,921 B1* | 8/2004 | Lim, II | 348/97 |
| 6,891,571 B1* | 5/2005 | Shin et al. | 348/448 |

* cited by examiner

*Primary Examiner*—Michael H. Lee
(74) *Attorney, Agent, or Firm*—Mark A. Haynes; Haynes, Beffel & Wolfeld

(57) ABSTRACT

An output stream of the de-interlaced image frames is produced from an incoming stream of interlaced image fields, where the interlaced image fields include complementary pairs of fields, which together comprise a frame. An input buffer includes field buffers storing the incoming stream of interlaced image fields. Field match detection logic is coupled to the input buffer, and detects matching fields in field buffers storing fields from the incoming stream separated by one other field. De-interlace logic is coupled to the input buffer and reads complementary pairs of fields from the input buffer and outputs de-interlaced frames. Control logic causes the current field from one of the field buffers to be paired with a complementary field selected from one of two fields stored in adjacent field buffers. The control logic sets a mode for the de-interlace sequence, including a standard mode and a 3:2 pulldown mode.

15 Claims, 7 Drawing Sheets

| 1.    | L     | H       |
|-------|-------|---------|
| Bank0 | <Ae>  | Writing |
| Bank1 | Ao    | Ho      |

FIG. 4-1

| 2.    | L     | H       |
|-------|-------|---------|
| Bank0 | Ae    | Be      |
| Bank1 | <Ao>  | Writing |

FIG. 4-2

| 3.    | L       | H    |
|-------|---------|------|
| Bank0 | Writing | <Be> |
| Bank1 | Ao      | Bo   |

FIG. 4-3

| 4.    | L       | H    |
|-------|---------|------|
| Bank0 | Be      | Be   |
| Bank1 | Writing | <Bo> |

FIG. 4-4

| 5.    | L    | H       |
|-------|------|---------|
| Bank0 | <Be> | Writing |
| Bank1 | Cb   | Bb      |

FIG. 4-5

| 6.    | L    | H       |
|-------|------|---------|
| Bank0 | Be   | Ce      |
| Bank1 | <Cb> | Writing |

FIG. 4-6

| 7.    | L       | H    |
|-------|---------|------|
| Bank0 | Writing | <Ce> |
| Bank1 | Co      | Do   |

FIG. 4-7

| 8. | L | H |
|---|---|---|
| Bank0 | De | Ce |
| Bank1 | Writing | <Do> |

FIG. 4-8

| 9. | L | H |
|---|---|---|
| Bank0 | <De> | Writing |
| Bank1 | Do | Do |

FIG. 4-9

| 10. | L | H |
|---|---|---|
| Bank0 | De | Ee |
| Bank1 | <Do> | Writing |

FIG. 4-10

| 11. | L | H |
|---|---|---|
| Bank0 | Writing | <Ee> |
| Bank1 | Do | Eo |

FIG. 4-11

| 12. | L | H |
|---|---|---|
| Bank0 | Fe | Ee |
| Bank1 | Writing | <Eo> |

FIG. 4-12

| 13. | L | H |
|---|---|---|
| Bank0 | <Fe> | Writing |
| Bank1 | Fo | Eo |

FIG. 4-13

| 14. | L | H |
|---|---|---|
| Bank0 | <Fe> | Fe |
| Bank1 | Fo | Writing |

FIG. 4-14

| 15. | L | H |
|---|---|---|
| Bank0 | Writing | <Fe> |
| Bank1 | Fo | Go |

FIG. 4-15

| 16. | L | H |
|---|---|---|
| Bank0 | Ge | Fe |
| Bank1 | Writing | <Go> |

FIG. 4-16

| 17. | L | H |
|---|---|---|
| Bank0 | <Ge> | Writing |
| Bank1 | Ho | Go |

FIG. 4-17

| 18. | L | H |
|---|---|---|
| Bank0 | Ge | He |
| Bank1 | <Ho> | Writing |

FIG. 4-18

| 19. | L | H |
|---|---|---|
| Bank0 | Writing | <He> |
| Bank1 | Ho | Ho |

FIG. 4-19

| 20. | L | H |
|---|---|---|
| Bank0 | Ae | He |
| Bank1 | Writing | <Ho> |

FIG. 4-20

APPARATUS AND METHOD FOR DE-INTERLACING VIDEO, INCLUDING 3:2 PULLDOWN VIDEO

BACKGROUND OF THE INVENTION

1. Field of the Invention

The present invention relates to systems and methods for translating video formats from a first interlaced format to a second de-interlaced format. More particularly, the present invention relates to de-interlacing image fields from an interlaced video format to provide non-interlaced frames in the presence of multiple interlacing modes including the "3:2 pulldown" mode.

2. Description of Related Art

Typical television video formats include interlaced fields of image data, so that a single image frame is constructed by a combination of interlaced fields. For example, interlaced fields for a particular image frame include the first field that stores even-numbered lines in the image frame, and a second field that stores odd-numbered lines in the image frame. The NTSC standard television format includes frames provided as two interlaced fields, which are provided at a frequency of 60 fields per second (30 frames per second).

New digital display formats are often designed for non-interlaced frames. In order to convert a stream of interlaced fields into a stream of non-interlaced frames, the complementary even and odd fields are matched and combined to produce a single frame. For video streams that are encoded according to the standard interlacing scheme, the deinterlacing process is straightforward. However, a significant amount of video programming was initially recorded on film using a standard 24 frames per second. A standard of encoding such film known as "3:2 pulldown" developed based on the recognition that if you provided 60 fields per second, 5 fields are required for every two frames incoming at 24 frames per second. Thus, the encoding process would provide 3 fields from a first frame followed by two fields from a second frame, followed by three fields from a next frame, two from the next, and so on, in a 3:2 pulldown mode. This encoding technique is shown in FIG. 1, where four incoming frames A, B, C and D are encoded as ten outgoing fields AE, AO, AE, BO, BE, CO, CE, CO, DE, DO.

When de-interlacing video encoded using the 3:2 pulldown mode, unless special logic is applied, fields are paired erroneously. As can be seen in FIG. 1, if every current field is paired as would be appropriate for a standard interlace, to provide an output non-interlaced frame, errors occur. Thus, in FIG. 1, the fourth non-interlaced frame would be composed of a combination of the odd field BO of frame B with the even field AE of frame A. Other erroneous pairings also occur, as can be seen from FIG. 1.

Techniques have been developed to detect the 3:2 pulldown mode in incoming streams in order to recognize the interlacing pattern so that it may be corrected for during a de-interlacing process. Representative prior art systems are described in Gove et al., U.S. Pat. No. 5,390,071; Christopher et al., U.S. Pat. No. 5,689,301; and Swan, U.S. Pat. No. 6,055,018.

It is desirable to provide an apparatus and method for de-interlacing an incoming video stream, which detects the 3:2 pulldown mode quickly, accurately and in real-time which is based on simple logic that is practical for implementation in integrated circuit video controllers.

SUMMARY OF THE INVENTION

The present invention provides a system and method for a de-interlacing an interlaced incoming video source, that detects and locks a 3:2 pulldown source in a short time, even in the presence of scene changes in incoming video, and which is quick, accurate, and based on simple low-cost logic.

An embodiment of the invention includes an apparatus for producing an output stream of de-interlaced image frames from an incoming stream of interlaced image fields, where the interlaced image fields include complementary pairs of fields which together comprise a frame. The apparatus includes an input buffer including field buffers storing the incoming stream of interlaced image fields. Field match detection logic is coupled to the input buffer, and detects matching fields in field buffers storing fields from the incoming stream separated by one other field. De-interlace logic is coupled to the input buffer and reads complementary pairs of fields from the input buffer and outputs de-interlaced frames. Control logic causes fields from the incoming stream to be written to field buffers in the input buffer, and causes pairs of fields in input buffer to be supplied to the de-interlace logic in a de-interlace sequence. According to the de-interlace sequence, the current field from one of the field buffers is paired with a complementary field selected from one of two fields stored in adjacent field buffers. The control logic sets a mode for the de-interlace sequence, including a standard mode and a 3:2 pulldown mode.

Embodiments of the invention determine the selected one of the adjacent field buffers from which to pull the complementary field to be paired with a current field in an output frame, according to the 3:2 pulldown mode in response to the field match detection logic. The control logic in one embodiment locks the de-interlace sequence in the 3:2 pulldown mode as long as the field match detection logic indicates for at least every fifth current field, that the fields in the incoming stream separated by, or adjacent to, the current field match. The control logic in one embodiment enters the 3:2 pulldown mode for the de-interlace sequence, when the control logic is not in the 3:2 pulldown mode, and the fields in the incoming stream separated by the current field match.

The field match detection logic according to embodiments of the invention includes logic to determine differences that exceed a pixel difference threshold between corresponding pixels in the fields in incoming stream that are separated by the current field, to accumulate the differences that exceed the pixel difference threshold over at least a portion of the field buffers storing such fields, and to indicate a match if the accumulated differences exceed a field difference threshold. The pixel difference threshold and the field difference threshold are stored on the apparatus, and at least one of the thresholds is alterable by the user to tune performance of the de-interlace logic. Using the pixel difference threshold and the field difference threshold, random noise can be canceled which might otherwise interfere with the detection of 3:2 pulldown mode interlacing in the incoming video stream.

According to yet other embodiments, the input buffer comprises a set of field buffers including at least enough members to store a current field for supply to the de-interlace logic, to adjacent fields from which a complementary field is selected to be paired with the current field for de-interlacing, and at least one additional field for receiving an input field while a current field is supplied to the de-interlace logic. This input buffer structure supports real-time detection and de-interlacing of 3:2 pulldown mode video streams.

One advantageous embodiment according to the present invention includes an input buffer having a first bank with high and low field buffers, and a second bank with high and low field buffers. Field match detection logic detects matching fields in the high and low field buffers of the first bank and detects matching fields in the high and low field buffers in the second bank. Control logic causes fields from the incoming stream of interlaced fields to be written in a repeating sequence that includes writing to the high field buffer of the first bank, then writing to the high field buffer of second bank, then writing to the low field buffer of the first bank, and then writing to the low field buffer of the second bank. Also, the control logic causes fields in the input buffer to be supplied to the de-interlace logic in a de-interlace sequence, including (1) reading a current field from the low field buffer of the first bank paired with a complementary field selected from one of the high and low field buffers of the second bank, (2) reading a current field from the low field buffer of the second bank paired with a complementary field selected from one of the high and low field buffers of the first bank, (3) reading a current field from the high field buffer of the first bank paired with a complementary field selected from one of the high and low field buffers of the second bank, and (4) reading a current field from the high field buffer of the second bank paired with a complementary field selected from one of the high and low field buffers of the first bank.

The present invention provides a method for de-interlacing an incoming stream of interlaced image fields, that may be implemented using dedicated integrated circuit logic, programmable integrated circuit logic, logic implemented using computer programs with general-purpose processors, or a combination of logic types. The method generally comprises:

storing fields from an incoming stream in an input buffer;

generating indications based on differences in image data in two fields stored in the input buffer, the two fields preceding and following, respectively, a current field in incoming stream;

selecting paired fields from the input buffer, the paired fields including the current field and one of the two fields preceding and following, respectively, the current field in incoming stream according to a mode selected in response to said indications, wherein the mode is selected from the set of modes that includes as members a 3:2 pulldown mode and a standard mode; and de-interlacing that paired fields to produce an output image frame.

According to embodiments of the invention, the de-interlacing sequence is locked in a 3:2 pulldown mode so long as two fields preceding and following, respectively, every fifth current field match. In other embodiments, the de-interlacing sequence is switched from the standard mode to the 3:2 pulldown mode if two fields preceding and following, respectively, the current field match.

Embodiments of the present invention detect and de-interlace 3:2 pulldown mode video in real-time. Furthermore, the logic used to implement the detection and de-interlacing process is compact and easily implemented using dedicated integrated circuit logic technology.

Other aspects and advantages of the present invention can be seen on review of the drawings, the detailed description and the claims, which follow.

BRIEF DESCRIPTION OF THE DRAWINGS

FIGS. 4-1 through 4-20 illustrate input buffer utilization for each of 20 cases encountered in a 3:2 pulldown de-interlacing mode according to embodiments of the present invention.

FIG. 5 is a flowchart illustrating a basic de-interlacing process according to the present invention.

DETAILED DESCRIPTION

Figure 2:
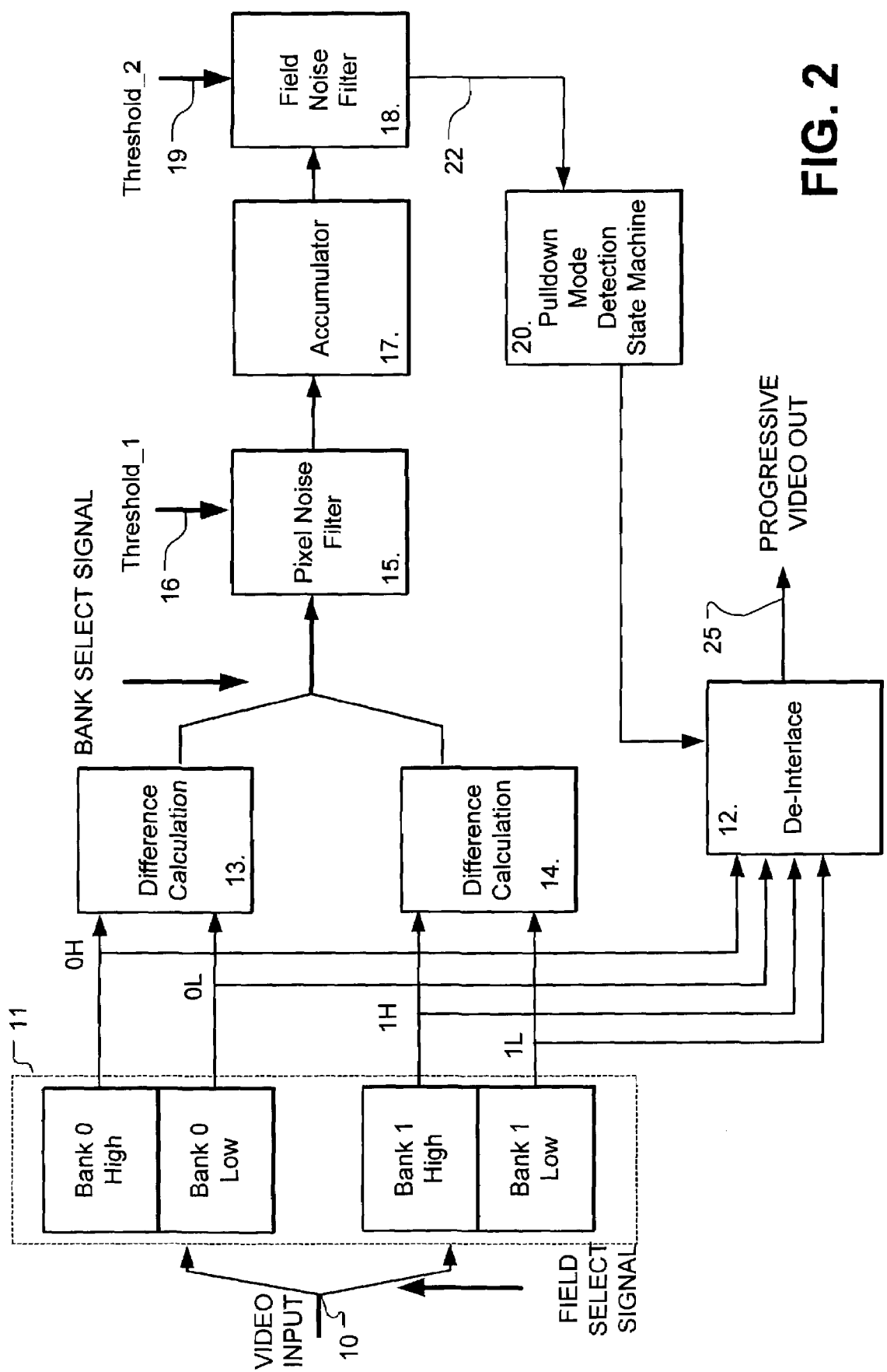
FIG. 2 is a logical block diagram of an apparatus implementing a de-interlacing process according to the present invention.

A detailed description of embodiments of the present invention is provided with reference to the figures, in which FIG. 2 is a logical block diagram of an embodiment of the invention. In the embodiment of FIG. 2, video input on bus 10 comprises an incoming stream of interlaced image fields, where the interlaced image fields include complementary pairs of fields (even and odd for example) which together comprise a frame. The video input from bus 10 is supplied to an input buffer 11, and from the input buffer 11 to de-interlace logic 12. The de-interlace logic 12 outputs de-interlaced frames on line 25. The input buffer 11 in this embodiment includes bank 0 and bank 1. Bank 0 has a high field buffer and a low field buffer. Bank 1 also has a high field buffer and a low field buffer. The high and low fields of banks 0 and 1 comprise memory space sufficient to store respective fields of the input video stream. Furthermore, the input buffer is implemented with read while write memory, allowing an input field to be written to one field buffer at the same time that a current field is supplied from another field buffer of the same bank to the de-interlace logic 12. The input buffer 11 can be implemented using a wide variety of memory buffer architectures which allows for storage of at least four fields of the input stream in order to support real-time de-interlacing of the input stream according to the logical process of the embodiment shown in FIG. 2.

The output of the input buffer 11 is logically or physically divided into four output buses coupled to the de-interlace logic 12, including a first bus 0H for the output of the high field of bank 0, a second bus 0L for the output of the low field of bank 0, a third bus 1H for the output of the high field of bank 1, and a fourth bus 1L for the output of the low field of bank 1.

The input bus 10 is controlled, using logical or physical switching or addressing, so that the input video stream fields are written in a pattern as follows: bank 0 high field, bank 1 high field, bank 0 low field, bank 1 low field, and repeating. The "current field" is output from the input buffer 11 and supplied to the de-interlace logic 12 in a pattern in parallel with the writing of the input fields. In one example, the current field output from the input buffer 11 is from the same bank of the input buffer as is being used for writing an input field. Thus, the pattern for selecting a current field in this example includes while bank 0 high field is being written, bank 0 low field is being supplied on bus 0L as the current field to the de-interlace logic 12, in the next cycle bank 1 low field is supplied on bus 1L as the current field to the de-interlace logic 12, in the next cycle bank 0 high field is supplied as the current field to the de-interlace logic 12, in the next cycle bank 1 high field is supplied as the current field to the de-interlace logic 12, and repeating.

The de-interlace logic 12 selects complementary fields for combination into a de-interlaced frame, including the current field and one of the preceding and following fields from the input video stream. The selected one of the preceding and following fields used for combination with the current field is determined by the pulldown mode used to encode the input video stream.

The output of the input buffer 11 is also applied to control logic for detecting the pulldown mode of the input video stream, and controlling the pulldown mode used by the de-interlace logic 12. The control logic includes logic for computing pixel by pixel differences between every other field in the incoming video stream. In the embodiment of FIG. 2, this logic includes difference calculation unit 13 which is coupled to the 0H and 0L output buses of bank 0 of the input buffer 11, and difference calculation unit 14 which is coupled to the 1H and 1L output buses of bank 1 of the input buffer 11. The difference calculation units 13, 14 compute differences between corresponding pixels in the high and low fields of their corresponding banks, such as by subtracting a value used to encode the color of the pixel in the low field from the corresponding value in the high field.

Bank select signal 24 is used to select the output of difference calculation unit 13 from bank 0 or the output of difference calculation unit 14 for bank 1 for supply to a pixel noise filter 15. The bank selected by the bank select signal 24 for a current difference calculation is the bank opposite to the bank from which the current field is being supplied to the de-interlace logic 12.

The pixel noise filter 15 determines whether the difference exceeds a first pixel noise threshold from line 16, such as one bit. If the pixel noise filter determines that the current difference value is greater than the pixel noise threshold, then the difference value is supplied to an accumulator 17, which accumulates all the difference values which exceed the pixel noise threshold over the entire field buffer, or over a portion of the field buffer sufficient to indicate whether the stored fields match. The output of the accumulator 17 is applied to a field noise filter 18. The field noise filter 18 outputs a first value indicating no match on line 19, if the output of the accumulator 17 exceeds a field noise threshold on line 22, and outputs a second value indicating a match on line 19 if the output of the accumulator 17 is less than the field noise threshold. The control signal on line 22 is applied to a pulldown mode selection state machine 20, which is responsive to the detection of matching fields to determine the pulldown mode of the input video stream. The state machine 20 controls the de-interlace logic 12 so that it selects the appropriate complementary field from the input buffer for combination with the current field to form a de-interlaced output frame on line 25.

The first threshold on line 16 provides a pixel noise threshold which is stored in alterable memory so that may be changed for the purposes of tuning performance of the control logic. Likewise, the second threshold on line 19 provides a field noise threshold stored in alterable memory so that it may be changed for the purposes of tuning performance of the control logic.

Figure 3:
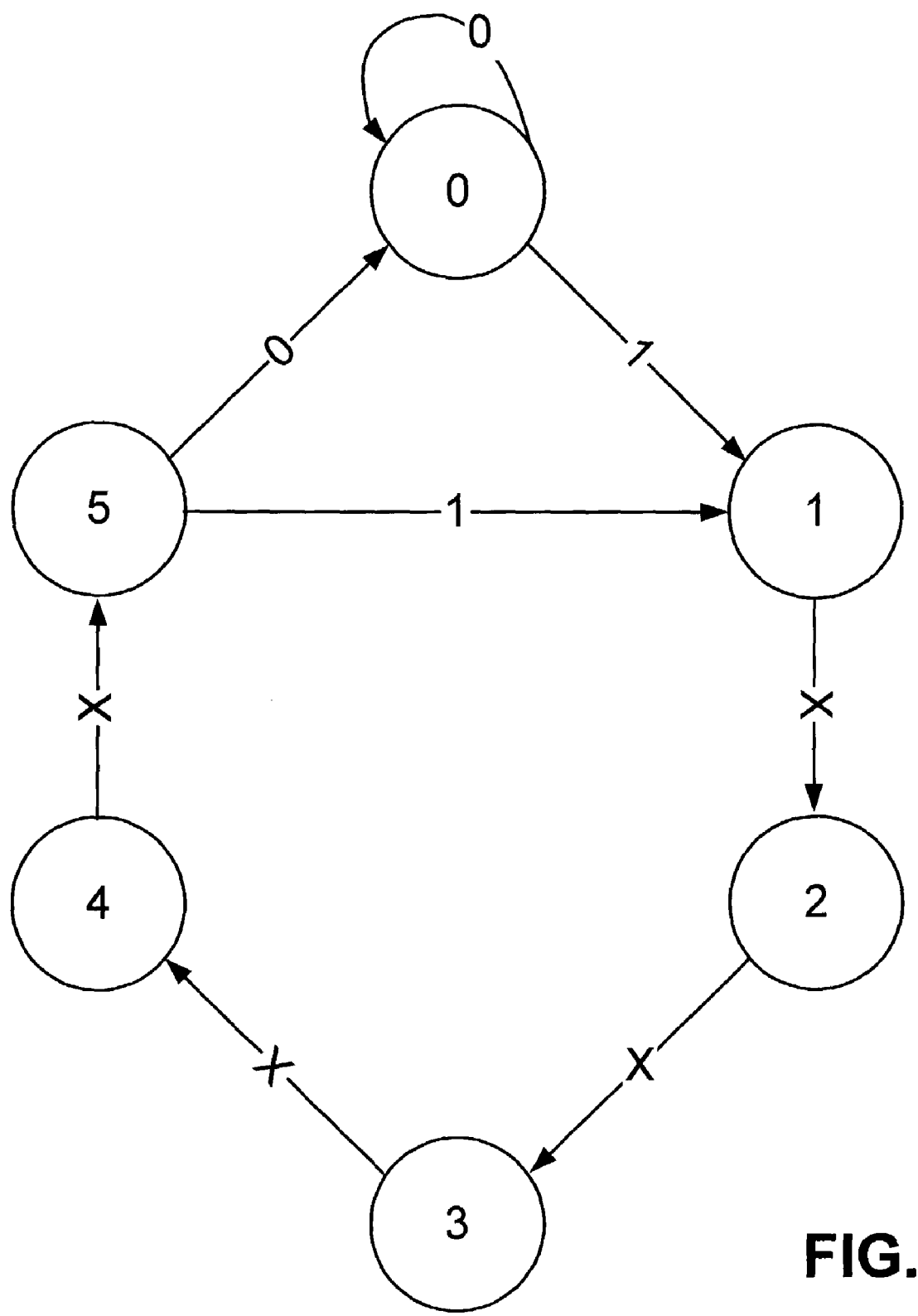
FIG. 3 illustrates a state diagram for determining a de-interlacing mode in an embodiment of the present invention.

FIG. 3 illustrates an embodiment of the pulldown mode selection state machine 20. The state machine 20 includes states 0 through 5. Transitions between states are based on the output on line 22 of the field noise filter 18, where value 0 corresponds to no match, value 1 corresponds to matching fields. In the diagram, X indicates a don't care condition on the output of the field noise filter 18. In state 0, the state machine indicates the standard interlace mode, causing the de-interlace logic 12 to match the current field with first the following field and then the preceding field in repeating pattern. The state machine stays in state 0 so long as no match is detected for the preceding and following fields of a current field. If a match is detected, then the state machine transitions to state 1 and enters the 3:2 pulldown mode for the current field. From state 1, the state machine transitions to state 2 for the next current field without regard to the output of the field noise filter 18. Likewise, the state machine transitions from state 2, to state 3, to state 4, to state 5 for each current field supplied out of the input buffer to the de-interlace logic 12, independent of the output of the field noise filter 18. In state 5, the output of the field noise filter 18 the state machine transitions to state 0, and returns to the standard pulldown mode if no match is detected, or transitions to state 1 and remains in the 3:2 pulldown mode if a match is detected. Thus, the state machine enters the 3:2 pulldown mode, if it is not in the 3:2 pulldown mode and a match is detected. The state machine remains locked in the 3:2 pulldown mode if a match is detected for every fifth current field.

The de-interlace logic 12 selects one of the preceding and following fields as the complementary field to be combined with the current field to form an output frame based upon the state in the state machine, and the location of the current field. For five states, and four possible locations from which the current field is read, 20 possible cases occur. The 20 cases are illustrated in FIGS. 4-1 through 4-20, and detailed in TABLES 1A and 1B, below, for an incoming stream of even and odd fields identified in the Field ID row of the tables.

Figure 1:
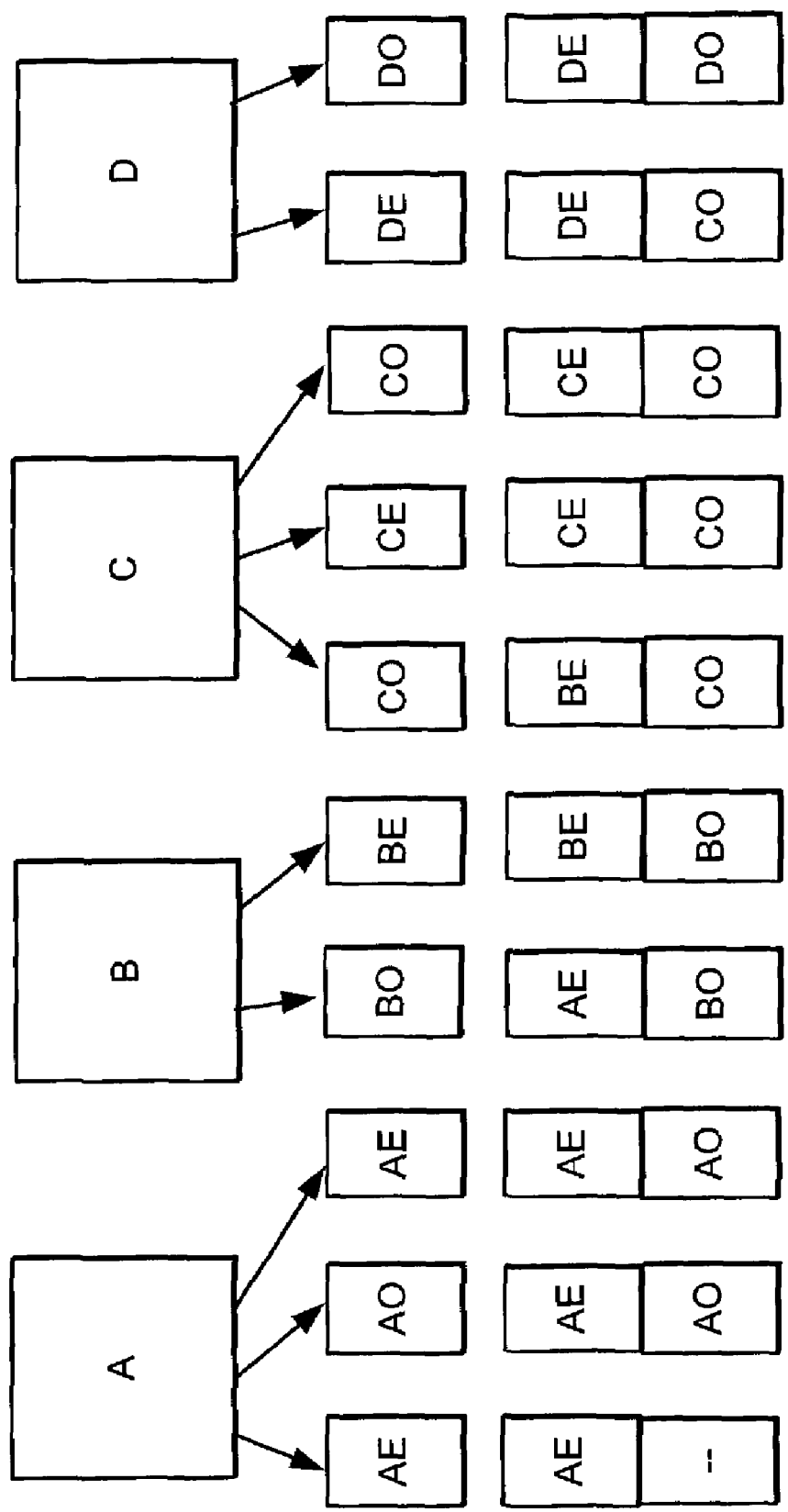
FIG. 1 illustrates encoding and de-interlacing of the prior art 3:2 pulldown mode.
Figure 5:
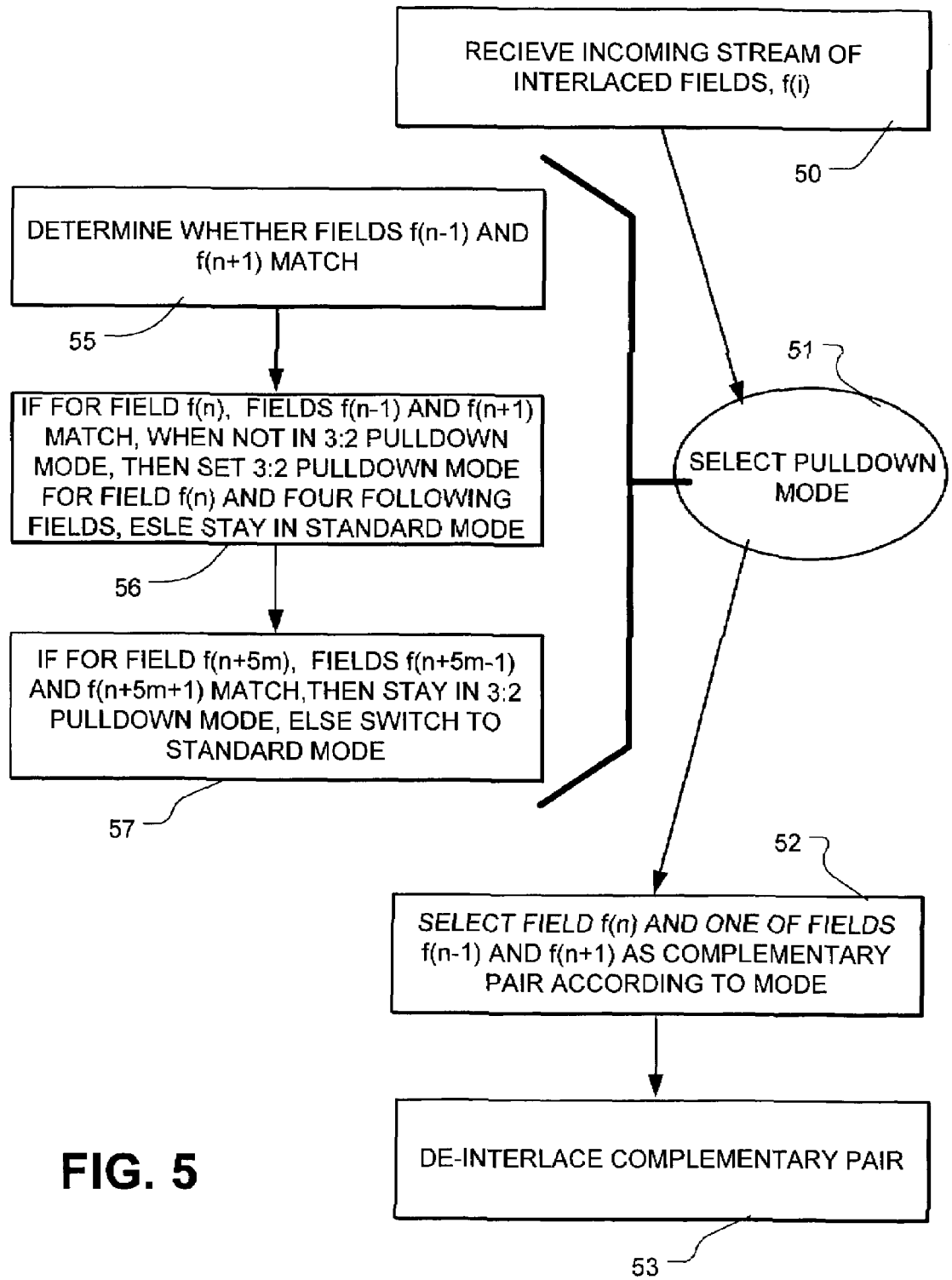

The tables are self-explanatory with reference to the following example for the four conditions encountered during the state 2 of the state machine. As can be seen in FIG. 4-1, when the current field (the current field is indicated by the <> symbols in the figures) is Ae and stored in the low field of bank 0, the high field of bank 0 is being written from the incoming stream. If the state of the state machine is state 2, the current field Ae is supplied from the low field of bank 0, and the complementary field Ao is read from the low field of bank 1. Three other conditions are possible during state 2 of the state machine as a illustrated in FIG. 4-6, FIG. 4-11, and FIG. 4-16, along with the corresponding columns in the TABLES 1A and 1B. As can be seen in FIG. 4-6, when the current field is Co read from the low field of bank 1 in state 2, the complementary field Ce is read from the high field of bank 0. As can be seen in FIG. 4-11, when the current field is Ee read from the high field of bank 0 in state 2, the complementary field Eo is read from the high field of bank 1. As can be seen in FIG. 4-16, when the current field is Ge read from the high field of bank 1, the complementary field Go is read from the low field of bank 1. With five possible states during the 3:2 pulldown mode, there are 20 cases illustrated in the figures and the following tables.

TABLE 1A

| Field ID (even-odd) | Ae | Ao | Be | Bo | Be | Co | Ce | Do | De | Do |
|---|---|---|---|---|---|---|---|---|---|---|
| Current Wr Field | 0H | 1H | 0L | 1L | 0H | 1H | 0L | 1L | 0H | 1H |
| Field State | 2 | 3 | 4 | 5 | 1 | 2 | 3 | 4 | 5 | 1 |
| Current Rd Field | 0L | 1L | 0H | 1H | 0L | 1L | 0H | 1H | 0L | 1L |

TABLE 1A-continued

| Field ID (even-odd) | Ae | Ao | Be | Bo | Be | Co | Ce | Do | De | Do |
|---|---|---|---|---|---|---|---|---|---|---|
| Complem. Field | 1L | 0L | 1H | 0H | 1H | 0H | 1L | 0L | 1H | 0L |
| FIG. | 4-1 | 4-2 | 4-3 | 4-4 | 4-5 | 4-6 | 4-7 | 4-8 | 4-9 | 4-10 |

TABLE 1B

| Field ID (even-odd) | Ee | Eo | Fe | Fo | Fe | Go | Ge | Ho | He | Ho |
|---|---|---|---|---|---|---|---|---|---|---|
| Current Wr Bank | 0 | 1 | 0 | 1 | 0 | 1 | 0 | 1 | 0 | 1 |
| Current Wr Field | 0L | 1L | 0H | 1H | 0L | 1L | 0H | 1H | 0L | 1L |
| Field State | 2 | 3 | 4 | 5 | 1 | 2 | 3 | 4 | 5 | 1 |
| Current Rd Field | 0H | 1H | 0L | 1L | 0H | 1H | 0L | 1L | 0H | 1H |
| Complem. Field | 1H | 0H | 1L | 0L | 1L | 0L | 1H | 0H | 1L | 0H |
| FIG. | 4-11 | 4-12 | 4-13 | 4-14 | 4-15 | 4-16 | 4-17 | 4-18 | 4-19 | 4-20 |

FIG. 5 illustrates an embodiment out of the de-interlacing process of the present invention. An incoming interlaced video stream is received, including fields f(i) where "i" is an integer representing a position in the incoming stream (block 50). A pulldown mode is selected for a current field f(n) (block 51). The current field f(n) and one of the adjacent fields f(n−1) and f(n+1) are selected as a complementary pair, according to the pull down mode (block 52). Finally, a de-interlaced frame is supplied based on the complementary fields. (block 53).

The pull down mode is selected by determining whether the adjacent fields f(n−1) and f(n+1) match (block 55). When the logic is not in the 3:2 pulldown mode, if for a current field f(n), fields f(n−1) and f(n+1) match, then the mode is set to the 3:2 pulldown mode, and locked for the next four fields. If no match is detected, then the logic stays in the standard mode (block 56). For every fifth field f(n+5m), where m goes from 1 up, while the logic is in the 3:2 pulldown mode, then it stays in the 3:2 pulldown mode if fields f(n+5m−1) and f(n+5m+1) match. Else, the logic transitions to the standard mode (block 57).

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An apparatus for producing an output stream of de-interlaced image frames from an incoming stream of interlaced image fields, the interlaced image fields including complementary pairs of fields which together comprise a frame, comprising:

an input buffer including field buffers storing the incoming stream of interlaced image fields;

field match detection logic, coupled to the input buffer, to assert a match signal upon detection of matching fields in field buffers storing fields from the incoming stream separated by a current field and;

de-interlace logic, coupled to the input buffer, to read complementary pairs of fields from the input buffer, and to output de-interlaced frames; and control logic, coupled to input buffer, the field match detection logic and the de-interlace logic, which causes fields from the incoming stream of interlaced fields to be written to field buffers in the input buffer, and which causes pairs of fields in the input buffer to be supplied to the de-interlace logic in a de-interlace sequence, including supplying a current field from one of the field buffers paired with a complementary field selected from one of two fields stored in adjacent field buffers to the de-interlace logic, wherein the control logic includes a state machine responsive to the field match detection logic to select the selected one of the adjacent field buffers storing the complementary field, including a first state in which a 3:2 pull down mode is not applied, a second state in which the 3:2 pull down mode is applied, and which is entered from the first state in response to assertion of the match signal for a current field, a third state in which the 3:2 pull down mode is applied, and which is entered from the second state for a next current field, a fourth state in which the 3:2 pull down mode is applied, and which is entered from the third state for a next current field, a fifth state in which the 3:2 pull down mode is applied, and which is entered from the fourth state for a next current field, and a sixth state in which the 3:2 pull down mode is applied, and which is entered from the first state for a next current field, wherein the state machine transitions from the sixth state to the first state if the match signal is not asserted for a next current field, and transitions from the sixth state to the second state if the match signal is asserted for a next current field.

2. The apparatus of claim 1, wherein the field match detection logic includes logic to determine differences exceeding a pixel difference threshold between corresponding pixels in the fields in the incoming stream separated by one other field, to accumulate said differences over at least a portion of the field buffers storing said fields, and to indicate a match if the accumulated differences exceed a field difference threshold.

3. The apparatus of claim 1, wherein the field match detection logic includes logic to determine differences exceeding a pixel difference threshold between corresponding pixels in the fields in the incoming stream separated by one other field, to accumulate said differences over at least a portion of the field buffers storing said fields, and to indicate a match if the accumulated differences exceed a field difference threshold, including stores for the pixel difference threshold and the field difference threshold, wherein at least one of said stores for the pixel difference threshold and the field difference threshold is alterable by a user.

4. The apparatus of claim 1, wherein the input buffer consists essentially of four field buffers.

5. The apparatus of claim 1, wherein the input buffer comprises a set of field buffers, including at least enough members to store a current field for supply to the de-interlace logic, two adjacent fields from which a complementary field is selected to be paired with the current field, and at least one additional field for receiving an input field white the current field is supplied to the de-interlace logic.

6. An apparatus for producing an output stream of de-interlaced image frames from an incoming stream of interlaced image fields, the interlaced image fields including complementary pairs of fields which together comprise a frame, comprising:
an input buffer including a first bank with high and low field buffers, and a second bank with high and low field buffers, storing the incoming stream of interlaced image fields;
field match detection logic, coupled to the input buffer, to detect matching fields in the high and low field buffers of the first bank, and matching fields in the high and low field buffers of the second bank;
de-interlace logic, coupled to the input buffer, to receive complementary pairs of fields from the input buffer, and to output de-interlaced frames; and
control logic, coupled to input buffer, the field match detection logic and the de-interlace logic, which causes fields from the incoming stream of interlaced fields to be written in a sequence, the sequence including writing to the high field buffer of the first bank, the high field buffer of the second bank, the low field buffer of the first bank, and the low field buffer of the second bank, and which causes pairs of fields in the input buffer to be supplied to the de-interlace logic in a de-interlace sequence, including reading a current field from the low field buffer of the first bank paired with a complementary field selected from one of the high and low field buffers of the second bank, reading a current field from the low field buffer of the second bank paired with a complementary field selected from one of the high and low field buffers of the first bank, reading a current field from the high field buffer of the first bank paired with a complementary field selected from one of the high and low field buffers of the second bank, and reading a current field from the high field buffer of the second bank paired with a complementary field selected from one of the high and low field buffers of the first bank.

7. The apparatus of claim 6, wherein the control logic includes logic responsive to the field match detection logic to determine the selected one of the low and high field buffers of the second bank storing the complementary field when a field from the first bank is the current field, and to determine the selected one of the low and high field buffers of the first bank storing the complementary field when a field from the second bank is the current field according to a 3:2 pulldown mode.

8. The apparatus of claim 6, wherein the control logic includes a state machine responsive to the field match detection logic to determine the selected one of the low and high field buffers of the second bank storing the complementary field when a field from the first bank is the current field, and to determine the selected one of the low and high field buffers of the first bank storing the complementary field when a field from the second bank is the current field, according to a 3:2 pulldown mode as long as the field match detection logic indicates for at least every fifth current field from one of the first and second banks, matching fields in the low and high field buffers in the other of the first and second banks.

9. The apparatus of claim 6, wherein the field match detection logic includes logic to determine differences exceeding a pixel difference threshold between corresponding pixels in the fields stored high and low fields of one of the first and second banks, to accumulate said differences over at least a portion of high and low fields, and to indicate a match if the accumulated differences exceed a field difference threshold.

10. The apparatus of claim 6, wherein the field match detection logic includes logic to determine differences exceeding a pixel difference threshold between corresponding pixels in the fields stored high and low fields of one of the first and second banks, to accumulate said differences over at least a portion of high and low fields, and to indicate a match if the accumulated differences exceed a field difference threshold, including stores for the pixel difference threshold and the field difference threshold, wherein at least one of said stores for the pixel difference threshold and the field difference threshold is alterable by a user.

11. The apparatus of claim 6, wherein the field match detection logic includes logic, which operates while a new field is being written to, and a current field is being supplied from, a selected one of the first and second banks, to determine differences exceeding a pixel difference threshold between corresponding pixels in the fields stored high and low fields of the other one of the first and second banks, to accumulate said differences over at least a portion of high and low fields, and to indicate a match if the accumulated differences exceed a field difference threshold.

12. A method for de-interlacing an incoming stream of interlaced image fields, the interlaced image fields including complementary pairs of fields which together comprise a frame, comprising:
storing fields in the incoming stream in an input buffer;
generating indications based on differences in image data in two fields stored in the input buffer, the two fields preceding and following, respectively, a current field in the incoming stream;
executing a state based process for selecting paired fields from the input buffer, the paired fields including the current field and one of the two fields preceding and following, respectively, the current field in the incoming stream according to a mode selected in response to said indications, the mode selected from a set of modes including a 3:2 pull down mode and a standard mode; and
de-interlacing the paired fields to produce an output image wherein the state based process includes
a first state in which a 3:2 pull down mode is not applied, a second state in which the 3:2 pull down mode is applied, and which is entered from the first state in response when said indications indicate a match, a third state in which the 3:2 pull down mode is applied, and which is entered from the second state for a next current field, a fourth state in which the 3:2 pull down mode is applied, and which is entered from the third state for a next current field, a fifth state in which the 3:2 pull down mode is applied, and which is entered from the fourth state for a next current field, and a sixth state in which the 3:2 pull down mode is applied, and which is entered from the first state for a next current field, and wherein the state based process transitions from the sixth state to the first state if the when said indications do not indicate a match for a next current field and transitions from the sixth state to the second state if the when said indications indicate a match for a next current field.

13. The method of claim 12, wherein the generating indications includes determining differences exceeding a pixel difference threshold between corresponding pixels in the fields preceding and following, respectively, the current field, accumulating said differences over at least a portion of the field buffers storing said fields, and indicating a match if the accumulated differences exceed a field difference threshold.

14. The method of claim 12, including providing field buffers for storing a current field, two adjacent fields from which a complementary field is selected to be paired with the current field, and at least one additional field, and receiving an input field in one field buffers while the current field is supplied to the de-interlace logic from another field buffer.

15. The method of claim 12, wherein the generating indications includes determining differences exceeding a pixel difference threshold between corresponding pixels in the fields preceding and following, respectively, the current field, accumulating said differences over at least a portion of the field buffers storing said fields, and indicating a match if the accumulated differences exceed a field difference threshold, and adjusting at least one of said pixel difference threshold and said field difference threshold to tune performance.

* * * * *

UNITED STATES PATENT AND TRADEMARK OFFICE
CERTIFICATE OF CORRECTION

| | | |
|---|---|---|
| PATENT NO. | : 7,142,246 B2 | Page 1 of 1 |
| APPLICATION NO. | : 10/403456 | |
| DATED | : November 28, 2006 | |
| INVENTOR(S) | : Yen-Ting Chen and Pei-Ming Shan | |

It is certified that error appears in the above-identified patent and that said Letters Patent is hereby corrected as shown below:

In claim 5, column 9, line 20, replace the word "white" with -- while --.

In claim 12, column 10, line 64, after the word "image" please insert -- frame; --.

In claim 12, column 11, line 18, after the word "field" please insert -- , --.

Signed and Sealed this

Eighteenth Day of September, 2007

JON W. DUDAS
*Director of the United States Patent and Trademark Office*